United States Patent [19]
Kummer

[11] 3,906,602
[45] Sept. 23, 1975

[54] TOOL HOLDER FOR REVERSIBLE CUTTING ELEMENT

[76] Inventor: Pierre Kummer, Rue des Pres 20, Tramelan (Canton of Bern), Switzerland

[22] Filed: Mar. 29, 1974

[21] Appl. No.: 456,179

[30] Foreign Application Priority Data
Apr. 3, 1973   Switzerland............... 4752/73

[52] U.S. Cl. ................................................. 29/96
[51] Int. Cl.² ............................................ B26D 1/00
[58] Field of Search ....................................... 29/96

[56] References Cited
UNITED STATES PATENTS
| | | | |
|---|---|---|---|
| 3,238,600 | 3/1966 | Milewski | 29/96 |
| 3,289,272 | 12/1966 | Stier | 29/96 |
| 3,314,126 | 4/1967 | Stier | 29/96 |
| 3,316,616 | 5/1967 | Milewski | 29/96 |
| 3,456,315 | 7/1969 | Stier | 29/96 |

FOREIGN PATENTS OR APPLICATIONS
2,107,238   4/1972   France ................. 29/96

*Primary Examiner*—Harrison L. Hinson
*Attorney, Agent, or Firm*—Marshall & Yeasting

[57]   ABSTRACT

A tool holder for a plate-shaped cutting element resting on a support surface of a shank. A central aperture of the cutting element is engaged by the head of a clamping stud which includes a shaft guided in a hole extending in the shank at an acute angle to said support surface. This shaft has a side portion which is form-lockingly engaged by a toothed side portion of a control member adjustable in the shank.

6 Claims, 18 Drawing Figures

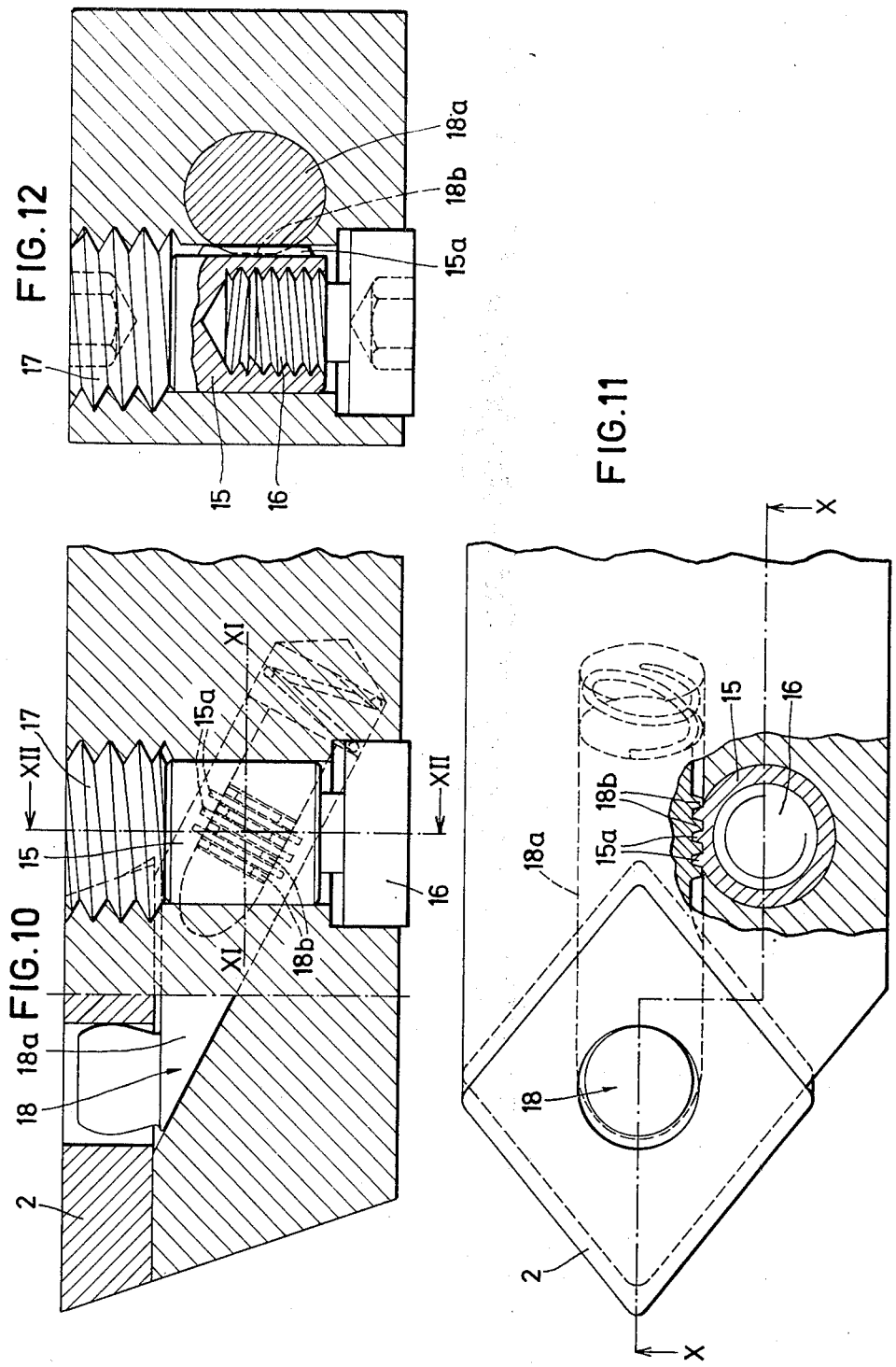

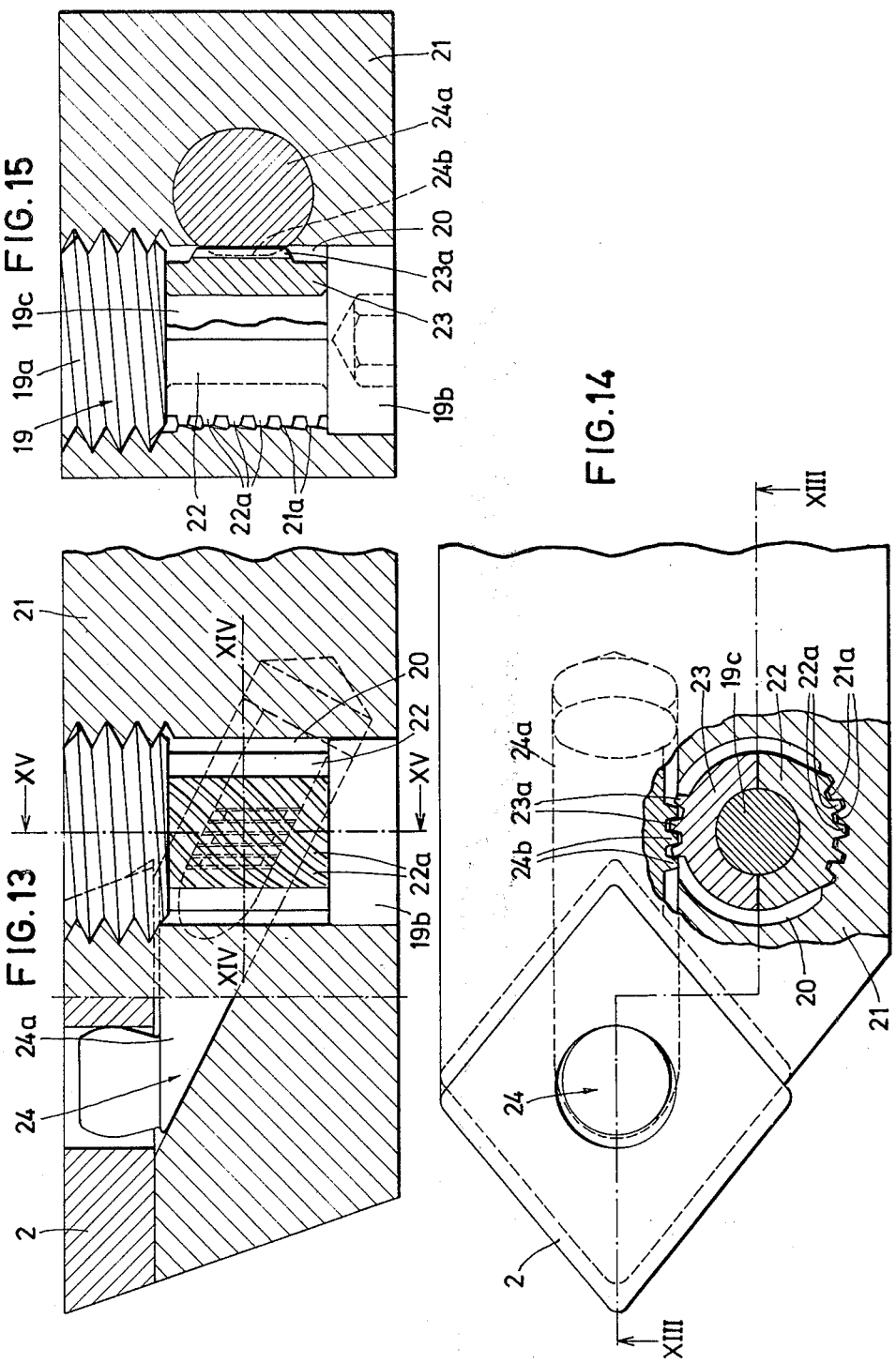

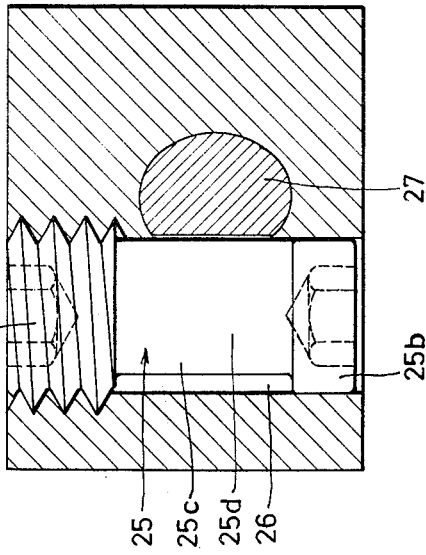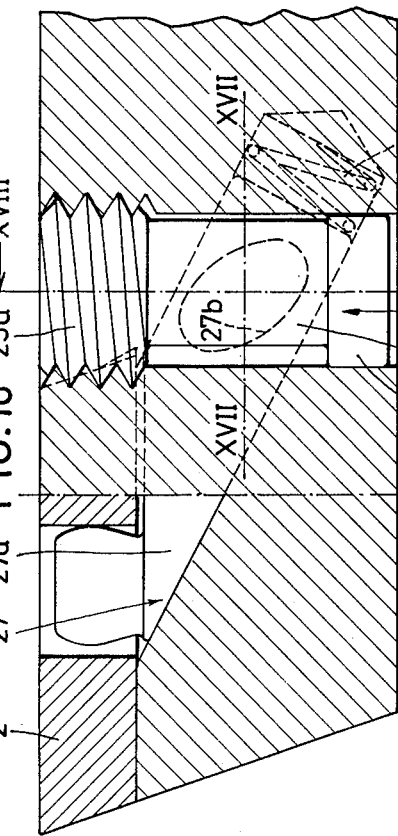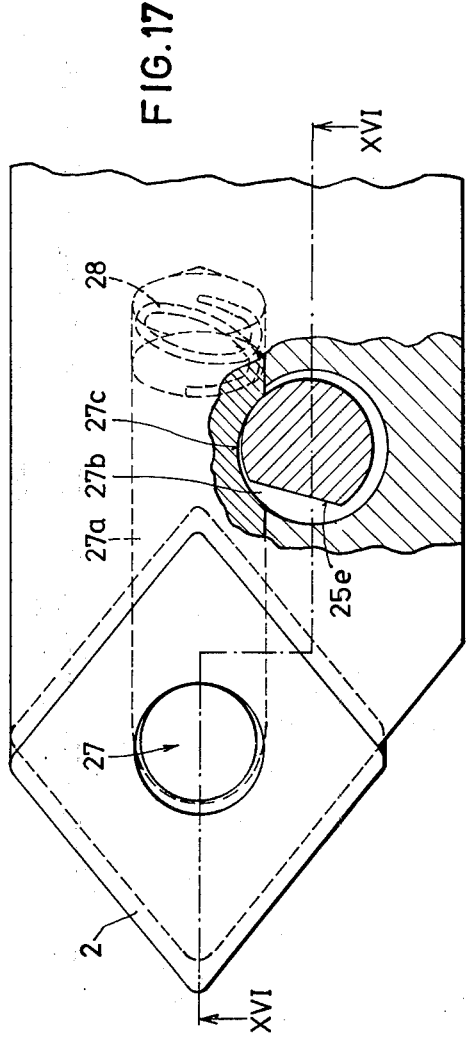

TOOL HOLDER FOR REVERSIBLE CUTTING ELEMENT

BACKGROUND OF THE INVENTION

This invention relates to a tool holder for a plate-shaped, apertured reversible cutting element, comprising a shank with a support surface for a reversible cutting element and a hole opening into the support surface at an acute angle, in which hole a shaft of a clamping stud, a clamping head of which is engaged in the aperture of the cutting element, is displaceably guided, and further comprising a control member which is adjustable in the shank and operatively engaged with the shaft of the clamping stud.

This type of tools or tool holders includes, for example, those disclosed in British Pat. Nos. 1,017,309 and 1,044,391, U.S. Pat. Nos. 3,280,450 and 3,289,272, and German Disclosed application No. 1,602,799. In all of these known constructions, the control member consists of a setscrew, the end of which, usually flat but as an exception conical (FIGS. 2 and 3 of U.S. Pat. No. 3,289,272), acts upon a flat wall of a notch in the shaft of the clamping stud or pin. The point of pressure then lies in the plane containing the axes of the clamping stud and the control screw. This entails various drawbacks. For one thing, there is only one point at which the control screw exerts pressure upon the clamping-stud shaft when the cutting element is clamped in place; thus the specific compression becomes excessively great if adequate clamping is to be achieved. Still other drawbacks may also be mentioned, the one or the other of which is more or less strikingly apparent depending upon which of the prior art constructions is considered, among them being large space requirements and unfavorable force-transmission relationship.

SUMMARY OF THE INVENTION

The primary object of the invention is to provide a tool holder of the aforementioned type which is further improved so as to make possible a very compact arrangement of the reversible cutting element, the clamping stud, and the control member, and so as to enable the tool holder to be miniaturized.

According to the present invention, this object is achieved in that the control member is disposed next to the shaft of the clamping stud, its peripheral surface being in form-locking operative engagement with that of the said shaft. The intersecting adjoining arrangement of the control member and the clamping-stud shaft enables a compact construction when the dimensions, especially those of the clamping and control members, are properly proportioned.

In a preferred embodiment of the invention, teeth provided on the peripheral surface of the control member are engaged with teeth on the peripheral surface of the clamping-stud shaft. Such an embodiment results in various additional advantages. The specific compression at a plurality of points where the teeth mesh is obviously less than at only one point of pressure. The control member, e.g, a control screw, may completely penetrate the shank at no disadvantage and may, for example, be provided at each end with a hexagon socket for the insertion of a hexagon key.

In all of the constructions taught by the prior art referred to above, the frictional force which is operative at the point of effective pressure, and which is directed at right angles to the plane containing the axes of the control screw and the clamping-stud shaft, can have its effect only in the sense of a unilateral increase of the wall pressure between the clamping-stud shaft and the blind-hole bore. In the construction according to the present invention, these frictional forces act at the points of engagement of the teeth parallel to the plane containing the axis of the clamping stud. In a preferred embodiment, it may be provided that the directions of pitch of the threads on the first longitudinal section of the control screw and on the taphole of the shank, respectively, depending on the placing of the control screw, on one side or the other of the clamping stud, are so chosen that the frictional forces operative at the teeth on the clamping-stud shaft upon each clamping and release operation favor the associated displacement of that shaft brought about by means of the engagement of the teeth.

By means of such a further improved construction, the transmission relationship can be made more efficient, which, the reversible cutting element being of a given size and the clamping force of a given magnitude, makes possible an additional reduction of the torque to be exerted on the control screw and, consequently, also a further reduction in size of the control screw and the clamping stud.

Other objects and advantages of the invention will become apparent from the following detailed description of several preferred embodiments thereof, taken in conjunction with the accompanying drawings.

BRIEF DESCRIPTION OF THE DRAWINGS

FIG. 10 is a section of a further embodiment taken on the line X—X of FIG. 11, FIG. 11 is a top plan view of the same embodiment, partially in section taken on the line XI—XI of FIG. 10, FIG. 12 is a cross-section taken on the line XII—XII of FIG. 10, FIG. 13 is a section of a further embodiment taken on the line XIII—XIII of FIG. 14, FIG. 14 is a top plan view of the same embodiment, partially in section taken on the line XIV—XIV of FIG. 13, FIG. 15 is a cross-section taken on the line XV—XV of FIG. 13, FIG. 16 is a section of a further embodiment taken on the line XVI—XVI of FIG. 17, FIG. 17 is a top plan view of the same embodiment, partially in section taken on the line XVII—XVII of FIG. 16, and FIG. 18 is a cross-section taken on the line XVIII—XVIII of FIG. 16.

DESCRIPTION OF THE PREFERRED EMBODIMENTS

Figure 1:
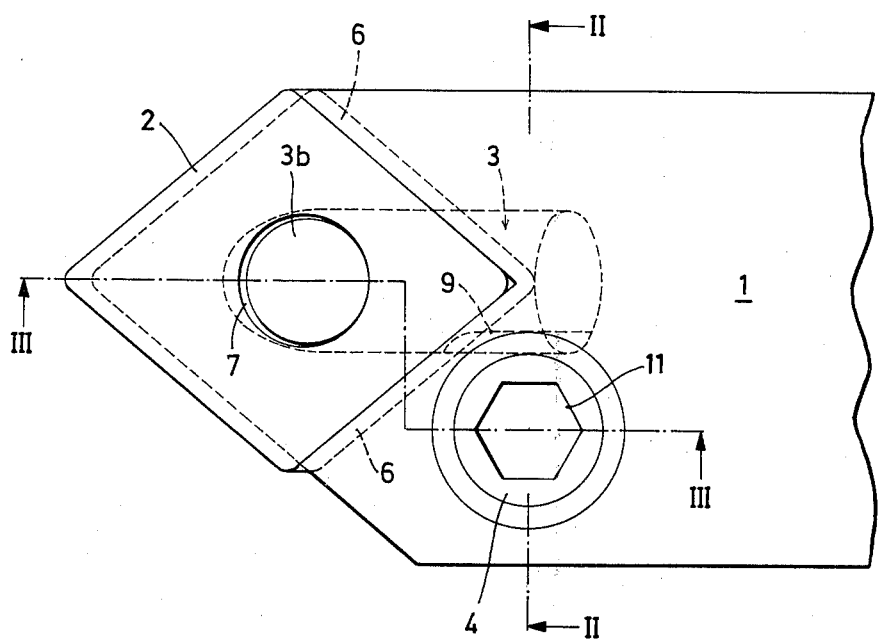
FIG. 1 is a top plan view of a first embodiment, viz., a cutting tool with a rhombic reversible cutting element clamped in place.

The cutting tool shown in FIGS. 1 to 5 is composed of the following parts: a shank 1, a reversible cutting element 2, a clamping stud 3, and a control screw 4. At the front end of the shank 1 is a recess for receiving the cutting element 2. Two of the four edges of the cutting element 2 rest against matching shoulders 6, having somewhat the profile illustrated in FIG. 3, and one of its flat faces rests on a support surface 5 of the shank 1. The cutting element 2 has a conventional cylindrical central aperture 7.

The shank 1 has a cylindrical blind hole 8 bored in from the support surface 5. The axis of hole 8 forms an angle $a$, of 30°, for example, with this surface. A cylindrical shaft 3a of the clamping stud 3 is lodged substantially free from play, yet easily displaceably, in the blind hole 8. In addition, a barrel-shaped clamping head 3b is machined out of the clamping stud 3 by lathe-turning cylindrical rod stock having a diameter substantially corresponding to that of the shaft 3a. The axis of the clamping head 3b forms an angle of 60° with the axis of the shaft 3a. Because the clamping head 3b is machined out of the rod stock, it lies within a cylindrical envelope surface—indicated by the dot-dash line $c$—which forms the continuation of the generated surface of the shaft 3a.

The shaft 3a has rack-like teeth 9 milled into a portion of its length parallel to a tangent plane. With the radial plane which is at right angles to this tangent plane, the rectilineal tooth grooves form a uniform angle $d$ which is equal to the angle $a$. The shank 1 has a bore 10 which is at right angles to the support surface 5 and intersects the blind hole 8. Above the plane of the support surface 5, the bore 10 takes the form of a taphole 10a, while below that plane it is smooth-walled, cf. reference numeral 10b.

The control screw 4 has an upper screw portion 4a which operates in the taphole 10a, an annular groove 4b which is provided purely for reasons of fabrication, a section with a series of annular grooves 4c and annular ribs 4d, and an end section 4e, the outside diameter of which is exactly equal to that of the external thread 4a and the annular ribs 4d and, aside from a very slight degree of play, also equal to the diameter of the smooth-walled section 10b of the bore 10. The annular grooves 4c can be cut with the same tool as the external thread 4a. A tapered annular shoulder 10c at the point of transition from 10a to 10b has the same angle of taper as the flanks of the annular ribs 4d and the thread ribs 4a. Furthermore, in a plane which contains the axis of 4 and 10 and which is at right angles to the aforementioned tangent plane of the teeth 9, hence in the drawing plane of FIG. 2, the longitudinal profile of the teeth 9 is the same as that of the series of annular ribs 4d and annular grooves 4c.

Figure 3:
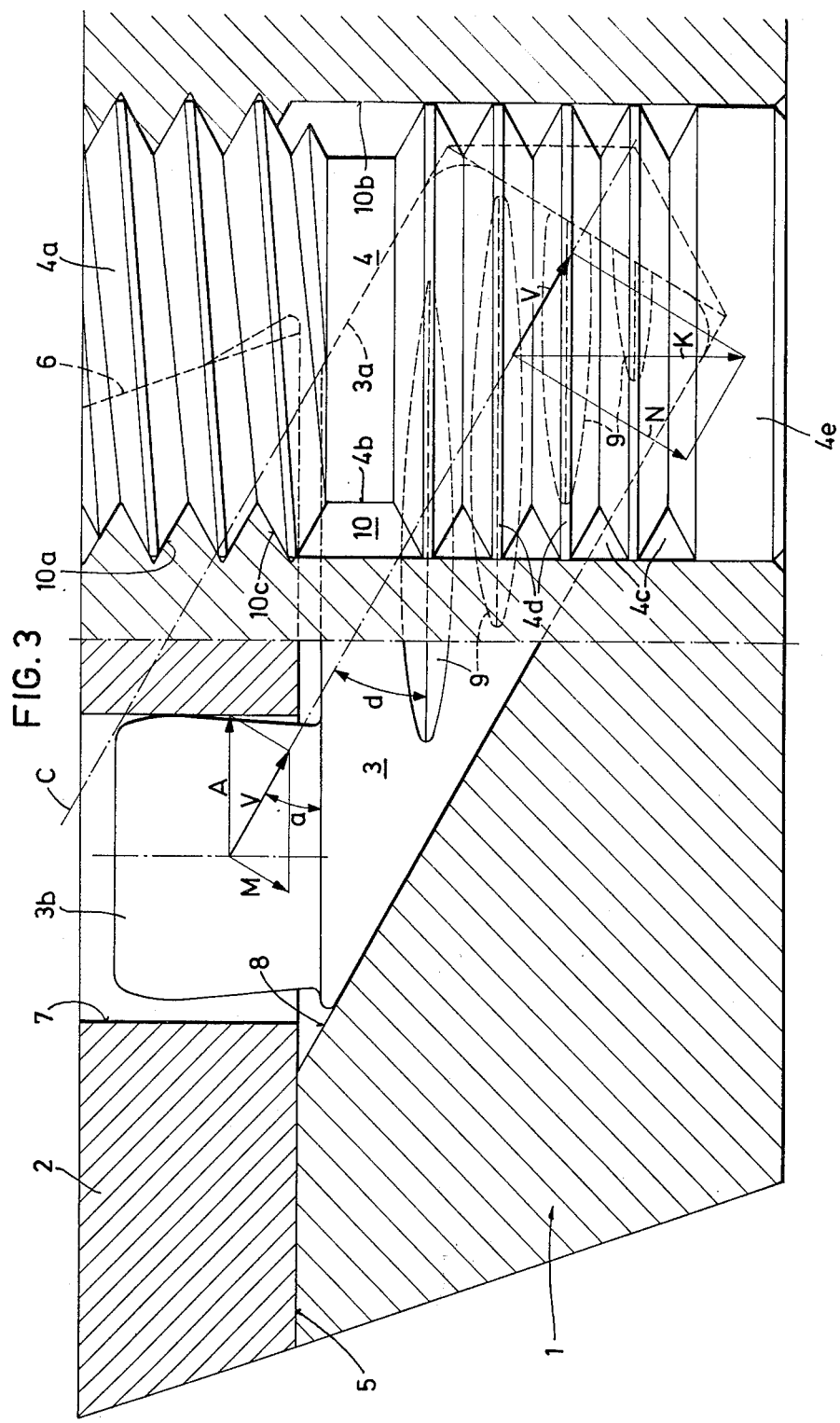
FIG. 3 is a longitudinal section taken on the dotdash line III—III of FIG. 1, on a larger scale.
Figure 4:
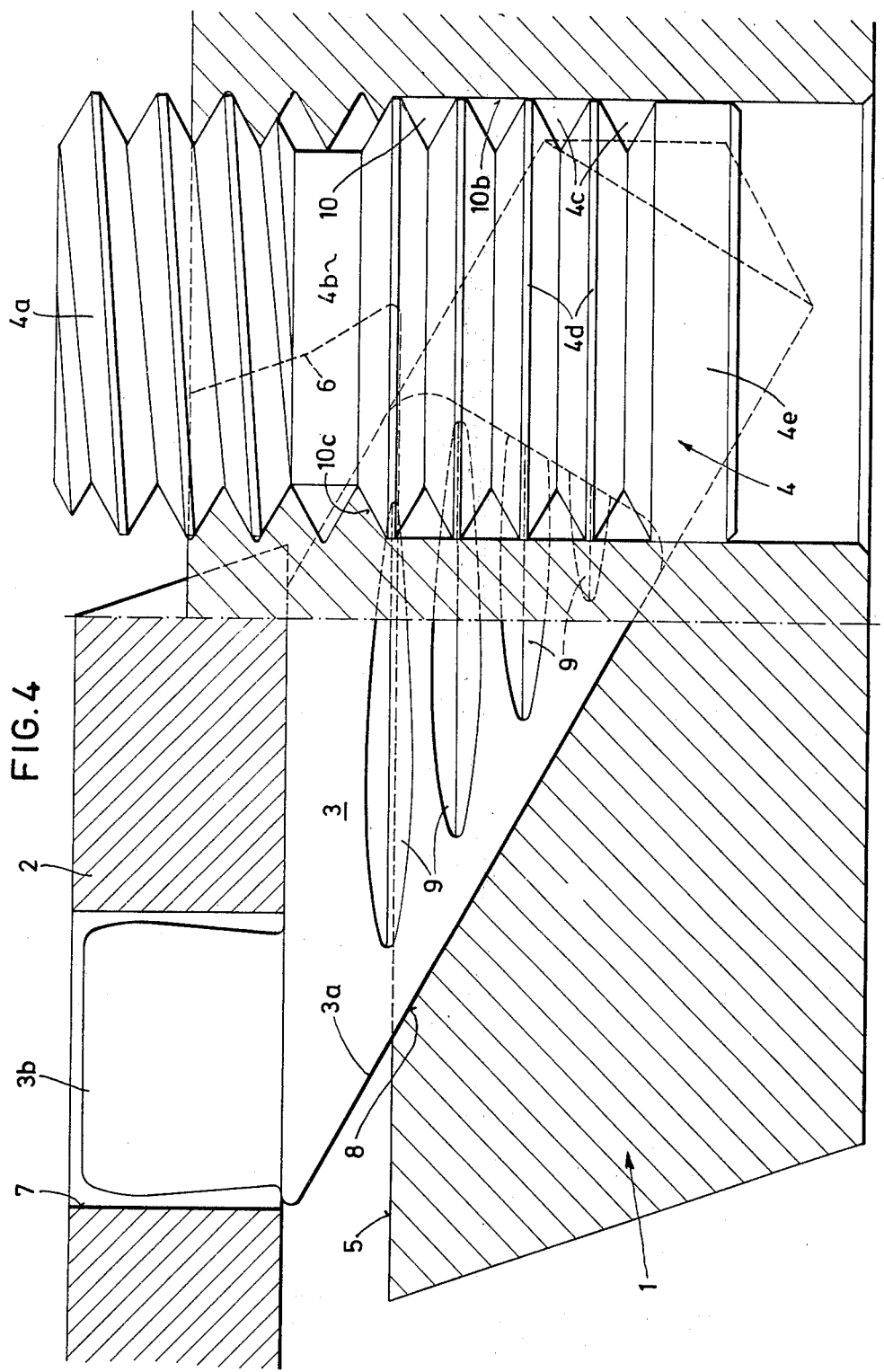
FIGS. 4 and 5 are two longitudinal sections, similar to that of FIG. 3, of the same cutting tool, illustrating other relative positions of the parts which are movable with respect to each other.
Figure 5:
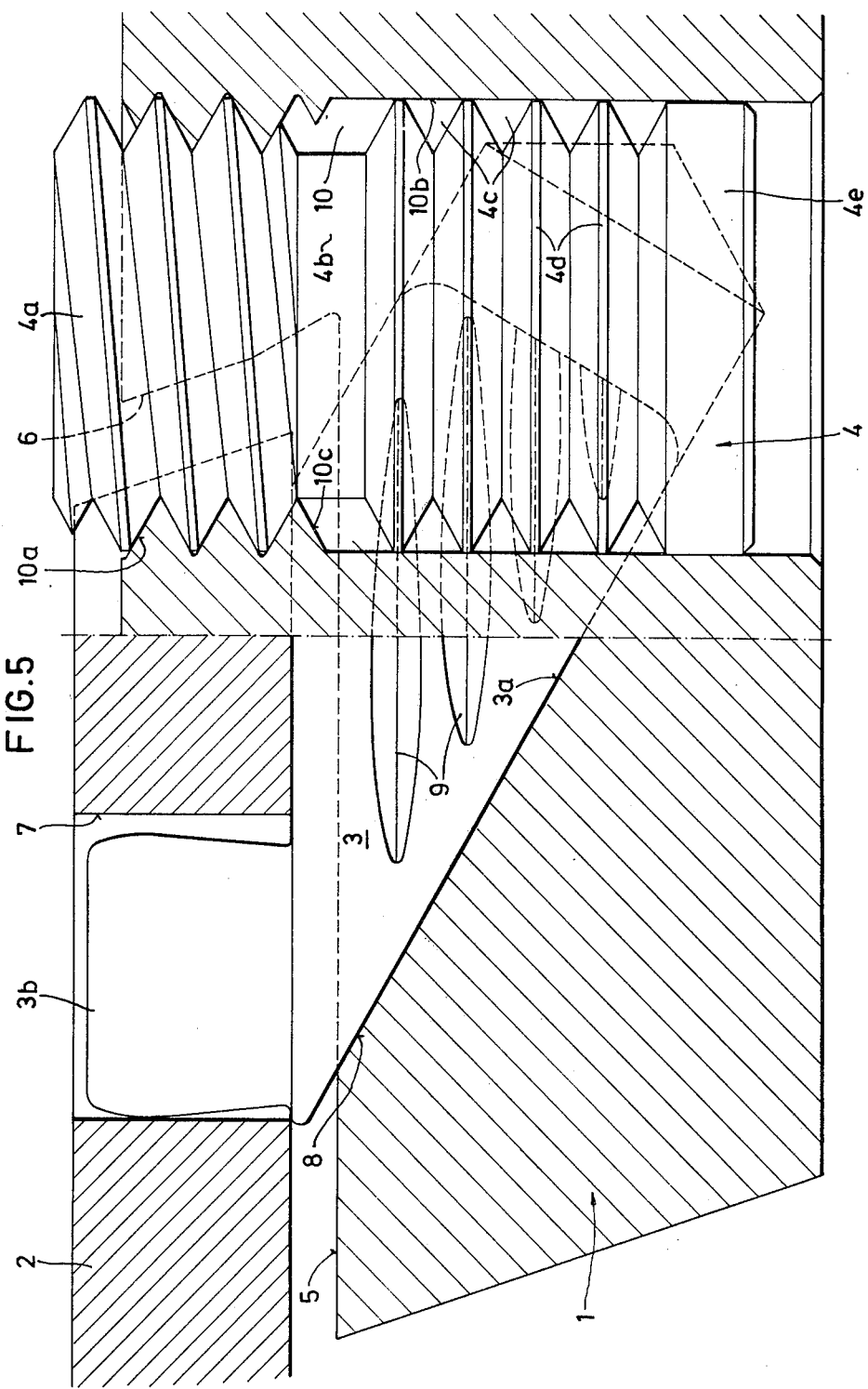

The mode of operation will be clearly seen from FIGS. 3, 4, and 5.

The annular shoulder 10c is so placed that, as shown in FIG. 4, it serves as a stop for the upper flank of the uppermost annular rib 4d in order to determine an upper end position of the control screw 4, in which position the teeth of parts 3 and 4 are no longer engaged, which means that the clamping stud 3 can be freely pulled out of the blind hole 8, in order to replace the clamping stud 3, for instance.

Now if the control screw 4 is screwed back by one turn into the position shown in FIG. 5, and then by one more turn into the position shown in FIG. 3, then the annular ribs 4d will act like a cylindrical rack on the teeth 9 of the clamping stud 3. The force K exerted by the control screw 4 on the clamping stud 3, downwardly directed parallel to the axis of the control screw 4, causes a displacement of the clamping stud 3 in the blind hole 8. The displacement force is V, the support reaction N, and therefore the angle $a$ chosen must be so great that tan $a$ is considerably greater than the coefficient of friction in the friction contact of 3 on 1. At the point of contact of the clamping head 3b with the wall of the aperture 7 of the cutting element 2, the force V acts once more, resolving into the clamping force A and the support reaction M. The control screw 4 has (in each of its ends or going continuously through) a hexagonal opening, indicated only in FIG. 1, for the insertion of a hexagon key. It has proven that upon just a moderate tightening of the control screw 4, an excellent, firm clamping of the reversible cutting element to the surfaces 5, 6 of the shank 1 can be achieved. Undesired loosening of the clamping action is definitely prevented even when vibrations are set up in the tool because the screw connection of 4a in 10a is self-locking, and the frictional forces attributable to the forces A and N are operative.

At this point, an important particularity of the design and its effects may be pointed out.

When the thread 4a, 10a is a right-hand thread as shown, actuating of the control screw 4 in the clamping direction, viz., from the position in FIG. 5 into that of FIG. 3, requires that the control screw 4 be turned clockwise (FIG. 1); the frictional forces acting upon the clamping-stud shaft 3a at the points where the teeth mesh will thus be directed towards the right (FIGS. 1 and 3–5), and owing to the inclination (angle $d$) of the blind hole 8 and the shaft of the clamping stud 3, they favor the displacement of the clamping stud which is already produced in any case by means of the tooth engagement. Upon loosening, the displacement of the clamping stud 3 is again favored in an analogous manner—turning of the control screw 4 counterclockwise, frictional forces at the points where the teeth mesh directed towards the left.

Figure 2:
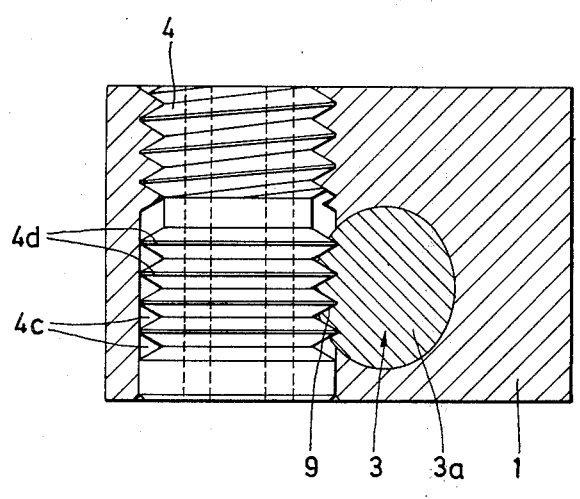
FIG. 2 is a cross-section taken on the line II—II of FIG. 1.

In an embodiment where the control screw 4 is situated on the other side of the clamping stud 3—on the upper side as viewed in FIG. 1, on the right-hand side as viewed in FIG. 2—the threads 4a, 10a would obviously have to be left-hand threads instead of right-hand threads so that during the clamping operation—this time upon turning the control screw 4 counterclockwise—the frictional forces acting at the clamping-stud shaft 3a again promote its displacement brought about by means of the engagement of the teeth.

It is also to be noted that the parts 3, 4 of the clamping device take up only a minimum of space and that there are no projections, meaning that there is no obstacle to the discharge of the shavings. It should be heeded in this respect, for instance, that in the clamped position (FIG. 3), each of the end faces of the control screw 4 is flush with the adjacent outer face of the shank 1.

Figure 6:
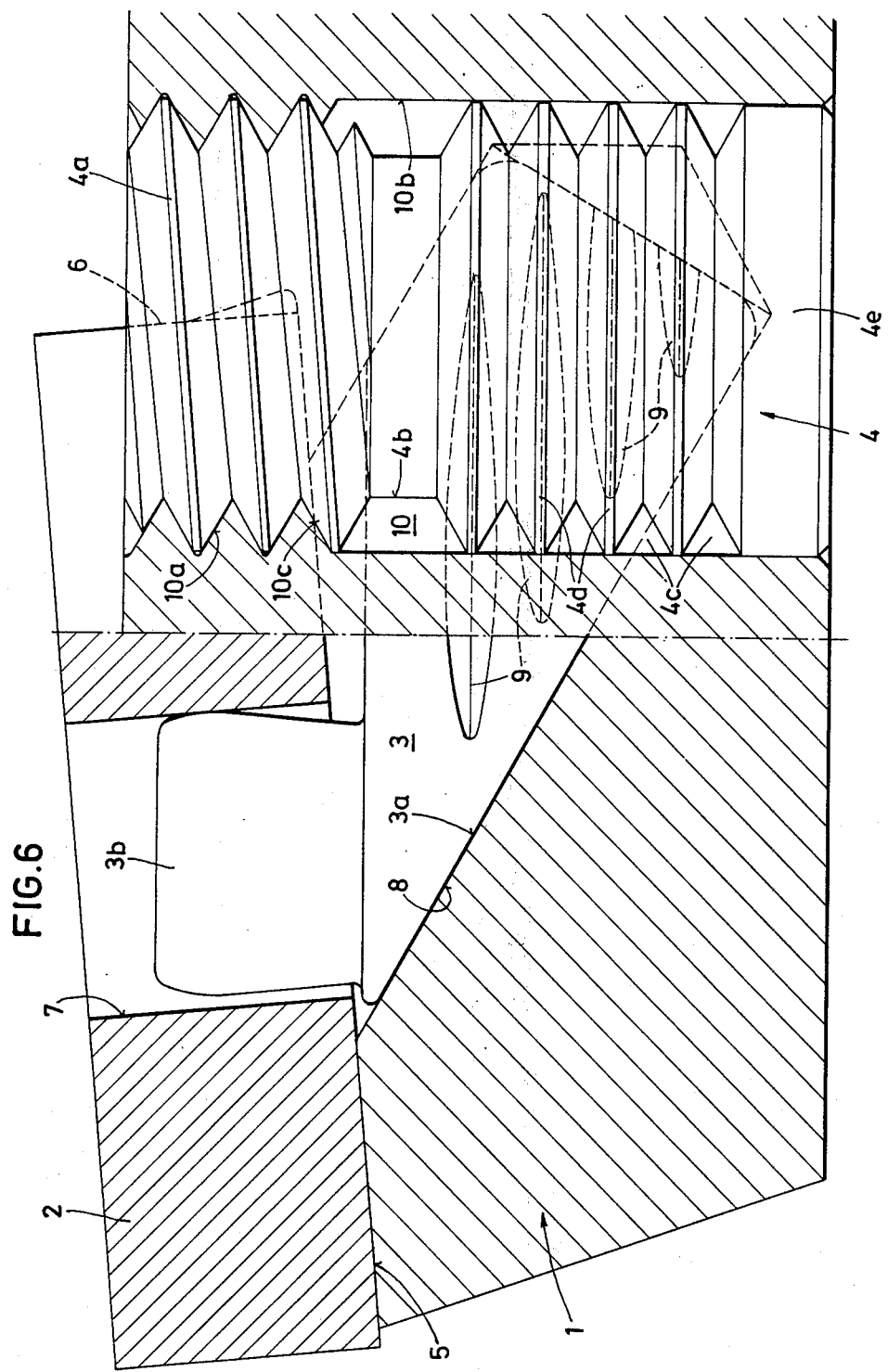
FIG. 6 is a longitudinal section, corresponding to that of FIG. 3, of a modified form of the embodiment shown in FIGS. 1 to 5.

The modified embodiment shown in FIG. 6 differs from the embodiment just described only in that the plane of the support surface 5 for the cutting element 2 is not at right angles to the axis of the control screw 4 but forms with it an angle of about 82°–86°, usually 84°, which results in a negative rake angle, or else 93°–97°, preferably 95°, which results in a positive rake angle.

Figure 7:
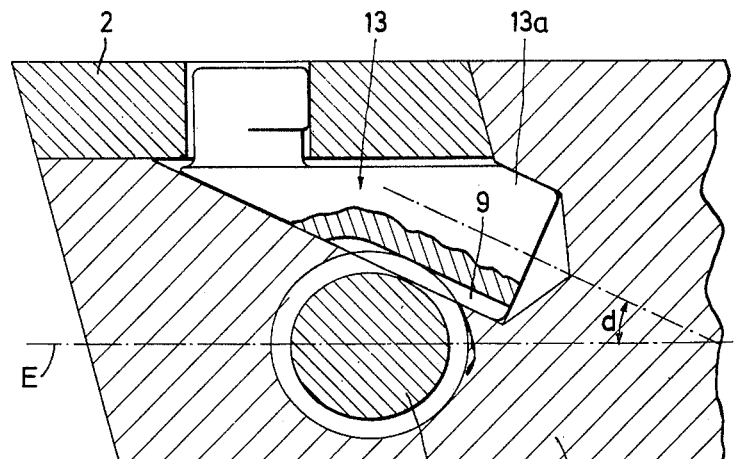
FIG. 7 is a longitudinal section of another embodiment taken on the line VII—VII of FIG. 8.
Figure 8:
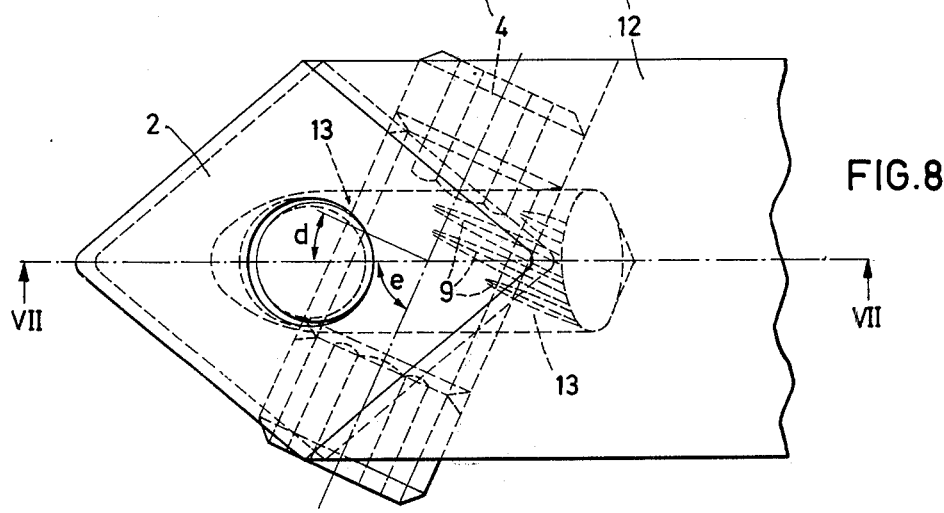
FIG. 8 is a top plan view corresponding to FIG. 7.

The embodiment shown in FIGS. 7 and 8 differs from that of FIGS. 1–5 only in that the control screw 4, and hence also the bore 10 which receives it, instead of being disposed in the shank with their axis at right angles to the plane of the support surface 5, are disposed with their axis in a plane E parallel to that plane, and correspondingly, the teeth 9 are disposed on the side of the shaft 13a of the clamping stud 13 facing this plane E. Thus the arrangement of the control screw 4 is tilted by 90° around the longitudinal axis of the clamping-stud shaft 13a as compared with that of FIGS. 1–5; the angle d of inclination of the teeth 9 on the shaft 13a is again to be found, and the mode of operation is exactly the same as that of the first embodiment.

Figure 9:
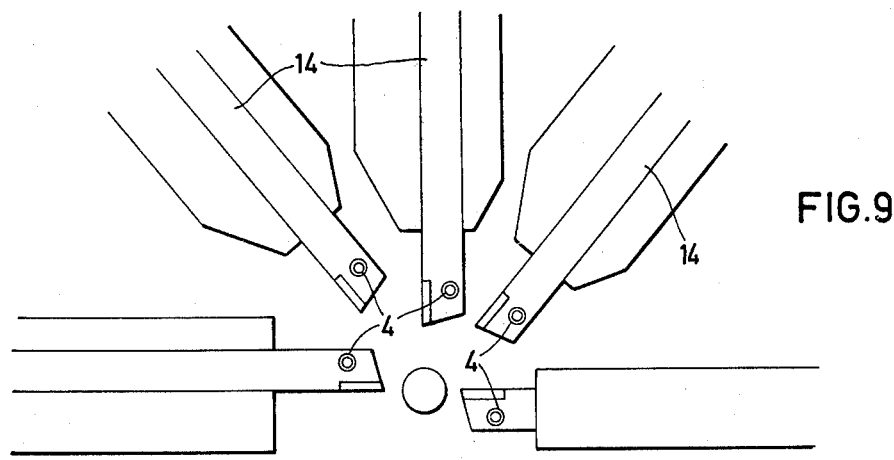
FIG. 9 is a skeleton sketch of a well-known fan-like arrangement of a plurality of cutting tools on an automatic lathe, to which the cutting tool illustrated in FIGS. 7 and 8 lends itself particularly well.

This modified embodiment lends itself, for example, to cutting tools which are intended to be used in the well-known fan-like arrangement, shown in FIG. 9, on certain automatic lathes. In cutting tools thus arranged, designated by reference numeral 14 in FIG. 9, good accessibility to the control screws 4 is then ensured. The situation is similar when the tool is a roller-like milling tool, on each of the individual teeth of which a reversible cutting element is replaceably clamped with the aid of the clamping device described.

It is to be understood that in all embodiments, the reversible cutting element 2 and the associated recess in the shank may take any other of the usual forms—e.g., triangular shape, square shape, circular shape—instead of the rhombic shape shown.

Moreover, other designs of the tooth engagement of the form-locking operative connection between the control screw and the clamping stud might enter into consideration. For instance, instead of the series of annular ribs on the control member—which are tantamount to a thread with a pitch of zero—a thread might be provided, the pitch of which would then have to be different from that of the screw connection 4a, 10a because otherwise the control screw would not exert any displacing or clamping action on the clamping stud when it is turned.

The head of the clamping stud need not have the barrel shape shown in FIGS. 3–5, which enables the use of the same clamping stud for differing inclined positions of the cutting element (see FIG. 3 as compared with FIG. 6); instead, it may take the form shown in FIG. 7, for example, or simply be cylindrical.

The modified embodiments illustrated in FIGS. 10–12, 13–15, and 16–18 differ from the first embodiment only as regards the means for controlling the clamping stud.

In the modification according to FIGS. 10–12, the control member consists of a screw cap 15 which is engaged with the threads of a screw 16 and, in addition, rests against a screw-pin 17. On its peripheral surface, the control member 15 has a number of teeth 15a which mesh with teeth 18b formed on a shaft 18a of a clamping stud 18. The teeth 15a, 18b extend in normal planes of the clamping-stud shaft 18a; hence an axial movement of the non-rotatable control member 15, caused by turning the screw 16 and/or the screw-pin 17, results in the longitudinal displacement of the clamping-stud shaft 18a.

In the modification according to FIGS. 13–15, the control mechanism comprises a member 19 with two thick end portions 19a, 19b and a thin middle portion 19c. The end portion 19a is provided with an external thread and can be screwed into a corresponding internal thread of a bore 20 of a shank 21, while the end portion 19b is guided in a matching portion of the bore 20. Applied to the middle portion 19c are two semi-cylindrical parts 22, 23, substantially free from play between the end portions 19a, 19b. The part 22 has several very steeply-pitched, helical teeth 22a which mesh with matching teeth 21a on the corresponding portion of the wall of the bore 20. The part 23 has several teeth 23a which are parallel to the axis and mesh with matching teeth 24b formed on a shaft of a clamping stud 24.

The turning of the member 19 causes, via the screw engagement of 19a in the corresponding portion of the bore 20, an axial movement of the member 19 together with the parts 22, 23. By means of the teeth 21a, 22a, there is produced from this axial movement a superimposed rotation of the part 22 around the axis of the member 19, which rotation necessarily brings about an identical rotation of the part 23. Through the engagement of the teeth 23a with those 24b of the clamping-stud shaft 24a, the latter is displaced in one direction or the other.

In the modification according to FIGS. 16–18, a control member 25 is provided, one end portion 25a of which can be screwed into a matching internal thread of a bore 26 of the shank, and the other end portion 25b of which is simply guided in the bore 26. A middle section 25c of the member 25 has a generated surface 25d which is spiral in cross-section, and a flattened portion 25e. A shaft 27a of a clamping stud 27 has an indentation 27b, the bottom 27c of which lies on the surface of an imaginary circular cylinder having its axis parallel to that of the member 25.

The spiral generated surface 25d is form-lockingly engaged with the bottom 27c of the indentation 27b, so that a clockwise rotation (FIG. 17) of the member 25 causes a displacement of the clamping-stud shaft toward the right. When the reverse operation takes place, a short pressure spring 28 holds the surfaces 25d, 27c in mutual contact.

What is claimed is:

1. A tool holder for a plate-shaped, apertured reversible cutting element, comprising a shank with a support surface for a reversible cutting element and a hole opening into the support surface at an acute angle, in which hole a shaft of a clamping stud, a clamping head of which is engaged in the aperture of the cutting element, is displaceably guided, wherein the improvement comprises a control member which is movably mounted in the shank at one side of the shaft of the clamping stud, meshing teeth on the periphery of said control member and on the periphery of said shaft by which movement of said control member drives said shaft longitudinally, the direction of movement of the teeth on said control member being non-parallel to the axis of said shaft to produce a wedging driving action upon the teeth on said shaft, and a screw-threaded connection between said control member and said shank, for locking said control member against movement and thereby locking said clamping stud in place.

2. A tool holder according to claim 1, wherein the control member is a control screw having a first longitudinal section which can be screwed into a taphole of the shank and a second longitudinal section operatively engaged with the shaft of the clamping stud, and wherein the directions of pitch of the threads on the first longitudinal section of the control screw and on the taphole of the shank, respectively, depending on the placing of the control screw on one side or the other of the shaft of the clamping stud, are so chosen that the frictional forces operative at the teeth on the shaft of the clamping stud upon each clamping and release operation favor the associated displacement of the said shaft brought about by means of the tooth engagement.

3. A tool holder according to claim 2, wherein the teeth on the second longitudinal section of the control screw consist of a series of annular ribs and annular grooves, and the teeth on the shaft of the clamping stud consist of matching, rectilinear tooth grooves cut in a tangent plane into the end portion of the said shaft remote from the clamping head.

4. A tool holder according to claim 3, wherein the annular ribs and annular grooves of the second longitudinal portion of the control screw have the same longitudinal profile and the same diameter as the thread on the first longitudinal section of the said screw and are immediately adjacent to the said thread.

5. A tool holder according to claim 4, wherein the annular ribs are guided in a smooth-walled bore section in the shank adjoining the taphole, the transition being formed by a tapered annular shoulder, the angle of taper of which corresponds to that of the flanks of the annular ribs, said shoulder being disposed in the shank in such a way that it serves as a stop for the screwing-in of the control screw at the point where the said teeth are no longer engaged, whereas after screwing back by a whole number of turns the reversible cutting element is clamped in place and the two end faces of the control screw are substantially flush with the respective outer surfaces of the shank.

6. A tool holder according to claim 1, wherein the axis of the control screw is situated in a plane which is substantially parallel to the support surface, and forms, with a plane containing the axis of the cylindrical shaft of the clamping stud and being perpendicular to the two aforementioned planes, an angle which is complementary to the angle formed by the axis of the shaft of the clamping stud with the plane containing the axis of the control screw.

* * * * *